United States Patent
Yuan et al.

(10) Patent No.: US 10,878,070 B2
(45) Date of Patent: Dec. 29, 2020

(54) METHOD OF CONTROLLING A TERMINAL BASED ON MOTION OF THE TERMINAL, TERMINAL THEREFORE, AND STORAGE MEDIUM

(71) Applicant: TENCENT TECHNOLOGY (SHENZHEN) COMPANY LIMITED, Guangdong (CN)

(72) Inventors: Lina Yuan, Shenzhen (CN); Luyi Lin, Shenzhen (CN); Yifeng Li, Shenzhen (CN); Liang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 16/016,831

(22) Filed: Jun. 25, 2018

(65) Prior Publication Data

US 2018/0307819 A1    Oct. 25, 2018

Related U.S. Application Data

(63) Continuation of application No. PCT/CN2017/102999, filed on Sep. 22, 2017.

(30) Foreign Application Priority Data

Sep. 28, 2016   (CN) .......................... 2016 1 0861832

(51) Int. Cl.
   *G06F 21/32*      (2013.01)
   *G06F 3/01*       (2006.01)
   (Continued)

(52) U.S. Cl.
   CPC ............ *G06F 21/32* (2013.01); *G06F 1/1694* (2013.01); *G06F 3/01* (2013.01); *G06F 3/017* (2013.01);
   (Continued)

(58) Field of Classification Search
   CPC .......... G06F 21/32; G06F 1/1694; G06F 3/01; G06F 3/017; H04L 63/0861; H04W 12/06;
   (Continued)

(56) References Cited

U.S. PATENT DOCUMENTS

| | | | |
|---|---|---|---|
| 7,697,778 B2* | 4/2010 | Steinberg | G06T 7/20 382/255 |
| 8,254,647 B1* | 8/2012 | Nechyba | G06K 9/036 382/118 |

(Continued)

FOREIGN PATENT DOCUMENTS

| | | |
|---|---|---|
| CN | 103581218 A | 2/2014 |
| CN | 104780308 A | 7/2015 |

(Continued)

OTHER PUBLICATIONS

International Search Report of PCT/CN2017/102999 dated Dec. 27, 2017 [PCT/ISA/210].

*Primary Examiner* — Jeffery L Williams
*Assistant Examiner* — Thanh T Le
(74) *Attorney, Agent, or Firm* — Sughrue Mion, PLLC

(57) ABSTRACT

A method for controlling a terminal is provided. The terminal includes a capturing apparatus and at least one processor. An image is acquired by the capturing apparatus. A motion parameter of the terminal is obtained. Image processing on the acquired image is controlled to be performed based on the motion parameter being equal to or less than a preset parameter threshold, and skipped based on the motion parameter being greater than the preset parameter threshold.

16 Claims, 6 Drawing Sheets

(51) Int. Cl.
  *G06F 21/31* (2013.01)
  *H04W 12/06* (2009.01)
  *H04N 5/232* (2006.01)
  *G06K 9/00* (2006.01)
  *H04L 29/06* (2006.01)
  *G06F 1/16* (2006.01)
(52) U.S. Cl.
  CPC ......... *G06F 21/31* (2013.01); *G06K 9/00268* (2013.01); *G06K 9/00281* (2013.01); *G06K 9/00288* (2013.01); *G06K 9/00335* (2013.01); *H04L 63/0861* (2013.01); *H04N 5/232* (2013.01); *H04N 5/23219* (2013.01); *H04N 5/23222* (2013.01); *H04N 5/23245* (2013.01); *H04N 5/23258* (2013.01); *H04N 5/232411* (2018.08); *H04W 12/06* (2013.01); *G06F 2200/1637* (2013.01)
(58) Field of Classification Search
  CPC ......... H04N 5/232411; H04N 5/23219; H04N 5/23222; H04N 5/23245; H04N 5/23258; G06K 9/00268; G06K 9/00281; G06K 9/00288; G06K 9/00335
  USPC ........................................................ 713/186
  See application file for complete search history.

(56) References Cited

U.S. PATENT DOCUMENTS

| | | | | |
|---|---|---|---|---|
| 9,202,105 B1* | 12/2015 | Wang | ............... | G06F 21/32 |
| 9,471,831 B2* | 10/2016 | Kim | ............... | G06K 9/00228 |
| 9,621,806 B2* | 4/2017 | Xiao | ............... | H04N 5/23293 |
| 9,756,249 B1* | 9/2017 | Segapelli | ............... | H04N 5/23258 |
| 10,303,866 B1* | 5/2019 | Van Os | ............... | G06K 9/00281 |
| 10,360,440 B2* | 7/2019 | Lee | ............... | G06F 21/32 |
| 10,419,683 B2* | 9/2019 | Ogawa | ............... | H04N 5/23293 |
| 2003/0151674 A1* | 8/2003 | Lin | ............... | H04N 5/232941 348/222.1 |
| 2008/0013851 A1* | 1/2008 | Ishiwata | ............... | H04N 5/232945 382/255 |
| 2009/0153690 A1* | 6/2009 | Li | ............... | H04N 5/23258 348/222.1 |
| 2012/0013759 A1* | 1/2012 | Chen | ............... | H04N 5/23219 348/222.1 |
| 2012/0235790 A1* | 9/2012 | Zhao | ............... | H04W 12/06 340/5.83 |
| 2013/0258122 A1* | 10/2013 | Keane | ............... | H04N 5/23267 348/208.4 |
| 2013/0263231 A1* | 10/2013 | Lautenschlager | ....... | H04L 63/18 726/4 |
| 2014/0150071 A1 | 5/2014 | Castro et al. | | |
| 2014/0150072 A1* | 5/2014 | Castro | ............... | H04L 63/104 726/5 |
| 2016/0063235 A1* | 3/2016 | Tussy | ............... | G06Q 20/3276 726/6 |
| 2016/0295618 A1* | 10/2016 | Kimura | ............... | H04W 68/005 |
| 2016/0381030 A1* | 12/2016 | Chillappa | ............... | H04W 4/70 726/11 |
| 2017/0132408 A1* | 5/2017 | Kim | ............... | G06K 9/6255 |
| 2018/0082416 A1* | 3/2018 | Arulesan | ............... | H04N 5/23219 |
| 2018/0181737 A1* | 6/2018 | Tussy | ............... | G06K 9/00335 |
| 2019/0286902 A1* | 9/2019 | Rowe | ............... | H04L 9/3226 |

FOREIGN PATENT DOCUMENTS

| | | |
|---|---|---|
| CN | 105205429 A | 12/2015 |
| CN | 105391940 A | 3/2016 |
| CN | 105700277 A | 6/2016 |
| CN | 105744142 A | 7/2016 |
| CN | 105827914 A | 8/2016 |

* cited by examiner

```
accelerometer_sensor:
  default:{
    threshold_accelerometer1: 1.0f;
    threshold_accelerometer2: -1.0f;
  }
  MotoxPro:{
    threshold_accelerometer1: 1.2f;
    threshold_accelerometer2: -1.3f;
  }
  ............................

gyroscope_sensor:
  default:{
    threshold_gyroscope1: 1.5f;
    threshold_gyroscope2: -1.5f;
  }
  Huawei Nexus6P{
    threshold_gyroscope1: 1.3f;
    threshold_gyroscope2: -1.3f;
  }
  ............................
```

METHOD OF CONTROLLING A TERMINAL BASED ON MOTION OF THE TERMINAL, TERMINAL THEREFORE, AND STORAGE MEDIUM

CROSS-REFERENCE TO RELATED APPLICATIONS

This application is a continuation of International Application No. PCT/CN2017/102999, filed on Sep. 22, 2017, in the Chinese Patent Office, which claims priority from Chinese Patent Application No. 201610861832.1, filed in the Chinese Patent Office on Sep. 28, 2016, the disclosures of which are incorporated herein by reference in their entireties.

BACKGROUND

1. Field

Apparatuses and methods consistent with exemplary embodiments relate to electronic technologies, and in particular, to a method for controlling a terminal, a terminal, and a storage medium.

2. Description of the Related Art

An image may be used to convey visual information and help people to objectively and accurately understand the information. To enable an image to be shown to pass information that the image is intended to express, image processing needs to be performed on an acquired image, for example, image encoding, image compression, image enhancement, and/or image restoration. When the acquired image is blur or even invisible due to a reason from the outside (for example, the acquired image is blur because of a quick movement of a terminal), after the image processing is performed on the acquired image, image quality becomes poor. In addition, because a process of image processing is complex, a large quantity of system resources is occupied. Consequently, system resources are wasted.

SUMMARY

One or more exemplary embodiments provide a method for controlling a terminal, a terminal, and a storage medium, in which utilization of system resources is improved.

According to an aspect of an exemplary embodiment, there is provided a method for controlling a terminal. The terminal includes a capturing apparatus and at least one processor. An image is acquired by the capturing apparatus. A motion parameter of the terminal is obtained by the at least one processor. Image processing on the acquired image is controlled, by the at least one processor, to be performed and skipped based on the motion parameter being greater than the preset parameter threshold.

According to another aspect of an exemplary embodiment, there is provided a terminal including a capturing apparatus, at least one memory configured to store program code, and at least one processor configured to access the at least one memory and operate according to the program code. Motion parameter obtaining code is configured to cause the at least one processor to acquire an image by using the capturing apparatus and obtain a motion parameter of the terminal. Control code is configured to cause the at least one processor to perform image processing on the acquired image based on the motion parameter being equal to or less than a preset parameter threshold, and skip performing image processing on the acquired image based on the motion parameter being greater than the preset parameter threshold.

According to another aspect of an exemplary embodiment, there is provided a non-transitory computer-readable storage medium, storing a machine instruction. The machine instruction, when executed by one or more processors, causes the one or more processors to perform: obtaining an image acquired by a capturing apparatus; obtaining a motion parameter of a terminal, the terminal including the capturing apparatus; and controlling to perform image processing on an acquired image based on the motion parameter being equal to or less than a preset parameter threshold, and skipping the image processing on the acquired image based on the motion parameter being greater than the preset parameter threshold.

According to exemplary embodiments, when it is detected that the photographing apparatus (or capturing apparatus) is in the running state, an image is acquired by using the photographing apparatus and a motion parameter of the terminal is obtained. When the motion parameter is greater than the preset parameter threshold, an image control instruction is generated. Image processing performed on the acquired image is stopped according to the image control instruction. The terminal may not perform image processing on an image with poor image quality acquired when the photographing apparatus is in the running state and the motion parameter exceeds the preset parameter threshold. Therefore, image processing on an image with poor image quality may be prevented from occupying system resources, thereby improving utilization of the system resources.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

The following clearly and completely describes the technical solutions provided by the exemplary embodiments with reference to the accompanying drawings. Obviously, the described embodiments are only some embodiments instead of all embodiments of the disclosure. All other embodiments that can be obtained by a person of ordinary skill in the art based on the embodiments without creative effects shall fall within the protection scope of the disclosure.

After acquiring an image by using a photographing apparatus (or a capturing apparatus), a conventional terminal directly performs image processing on the acquired image. When the acquired image is blurred or invisible due to reasons from the outside, an image obtained by performing image processing on the acquired image has poor quality. Consequently, an image needs to be acquired by using the photographing apparatus again, which causes significant waste of system resources.

An exemplary embodiment provides a method for controlling a terminal, and the terminal is provided with a photographing apparatus. The terminal acquires an image by using the photographing apparatus and obtains a motion parameter of the terminal when it is detected that the photographing apparatus is in a running state; generates an image control instruction when the motion parameter is greater than a preset parameter threshold; and stops (or skips) performing image processing on the acquired image according to the image control instruction. This improves utilization of system resources.

The photographing apparatus may be disposed inside the terminal. For example, when the terminal is a device such as a mobile phone or a tablet computer, the photographing apparatus may be located inside a protective housing of the terminal. In another exemplary embodiment, the photographing apparatus may be disposed outside the terminal. For example, when the terminal is a notebook computer or a server, a communication connection may be established between the terminal and the photographing apparatus in a wired or a wireless manner.

The motion parameter may include one or more of an acceleration, an angular velocity, a motion amplitude, a motion frequency, a motion time, and the like of the terminal.

The method for controlling a terminal may be performed in a terminal such as a personal computer, a smartphone (for example, an Android mobile phone or an iOS mobile phone), a tablet computer, a palmtop computer, a mobile Internet device (MID), or a wearable smart device. The disclosure is not limited to this embodiment of this application.

Figure 1:
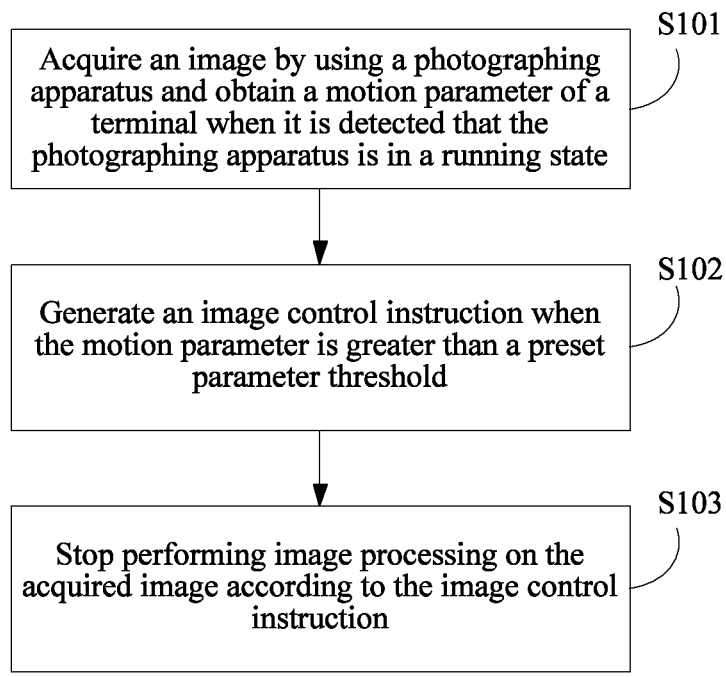
FIG. 1 is a schematic flowchart of a method for controlling a terminal according to an exemplary embodiment.

FIG. 1 is a schematic flowchart of a method for controlling a terminal according to an exemplary embodiment.

As shown in FIG. 1, the method for controlling a terminal may at least include the following operation.

S101: Acquire an image by using a photographing apparatus and obtain a motion parameter of the terminal when it is detected that the photographing apparatus is in a running state.

When detecting that the photographing apparatus is in a running state, the terminal may acquire the image by using the photographing apparatus and obtain the motion parameter of the terminal. During implementation, the terminal may detect whether the photographing apparatus is turned on. When the photographing apparatus is turned on, the terminal may determine that the photographing apparatus is in the running state, in other words, the photographing apparatus being turned is in the running state. Further, the terminal acquires the image by using the photographing apparatus. When the photographing apparatus acquires the image, the terminal may acquire the motion parameter of the terminal. The image acquired by the photographing apparatus may include a face image a scenery image, or the like. The disclosure is not limited in this embodiment.

Herein, in this embodiment, the photographing apparatus of the terminal is provided with an image sensor. The terminal acquires a face image by using the image sensor, and the face image is an image of a face previewed on a display screen of the terminal after a camera application on the terminal starts.

In another exemplary embodiment, the image sensor in this embodiment may be an image sensor that includes a CCD imaging element, a CMOS imaging element, and the like.

In this embodiment, the photographing apparatus may be a front-facing camera, a rear-facing camera, a dual camera, or the like disposed on the terminal. The disclosure is not limited in this embodiment.

In another exemplary embodiment, the terminal may receive a face recognition instruction and control, according to the face recognition instruction, the photographing apparatus to turn on, so as to determine that the photographing apparatus is in the running state. When the photographing apparatus is turned on, a face image is acquired by using the photographing apparatus.

In this embodiment, the terminal may implement a corresponding function by means of face recognition, to be specific, in a function application of the terminal, when performing an application, the terminal may perform identity authentication by using a facial recognition technology or manner, so as to implement or perform a function. A type of an application and a type of a function are not limited in this embodiment.

During implementation, the terminal may be an application client related to face recognition. The application client may perform identity authentication by means of face recognition, so as to perform operations such as password changing, application platform login, or order payment. The disclosure is not limited in this embodiment.

For example, after logging in to a QQ application by means of security information such as a QQ account and an account password, a user may click on a button of "QQ security center", and the terminal may display an interface of the security center in response to the clicking operation of the user. The user may change the account password in a facial recognition manner in the interface of the security center. For example, after the terminal displays the interface of the security center, the interface of the security center may include at least one manner for changing a password. The user may input a face recognition instruction to the terminal by clicking on a button of "face recognition". When receiving the face recognition instruction, the terminal controls the photographing apparatus to turn on, so as to determine that the photographing apparatus is in the running state. When the photographing apparatus of the terminal is turned on, a face image is acquired by using the photographing apparatus, so that after face recognition is performed on the face image, identity authentication of the user is complete, a password changing function is started, and the password is changed.

In this embodiment, the facial recognition technology may be performed by using a method for positioning a face key point. This embodiment does not limit implementations of the facial recognition technology.

The following describes a method for positioning a key point as an example. In an exemplary embodiment, the method for positioning a key point may include a method for positioning a face key point. Positioning of a face key point may be used to accurately obtain a position of the face key point by using an algorithm. The face key points are some key points that have a strong indication of a face, for example, an eye, a nose, a mouth, and a facial outline.

Figure 2:
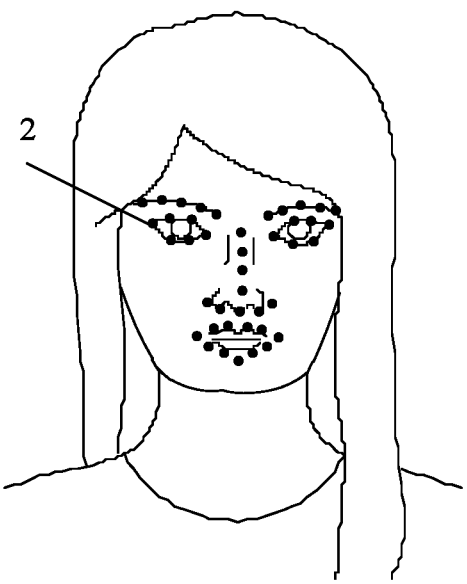
FIG. 2 is a schematic diagram of face key points according to an exemplary embodiment.

FIG. 2 is a schematic diagram of face key points (or key points) according to an exemplary embodiment.

In this embodiment, there may be 49 key points, and a key point 2 is shown in FIG. 2.

Herein, the terminal supports a facial recognition technology. To identify the face key points, a to-be-recognized target object (e.g., a face image) may be acquired. After detecting that the target object is the face image, the terminal may generate, on the face image, a target detection region to be used for face recognition positioning and mark the target detection region, enabling the marked target detection region to be displayed on the face image, so as to position the face key point, that is, a position of the face key point.

In this embodiment, for positions of specified face key points, some information is calculated at the positions of the face key points to be listed as a vector, in other words, to extract a feature. Subsequently, regression is performed on the feature, that is, combination is performed on each value of the vector. Finally, an offset from the face key points to an exact solution is obtained, so as to recognize a face. There may be various methods for extracting the feature, including a random forest, a sift, and the like. A characteristic of the face at current positions of the key points may be represented by using the extracted features.

The following uses an example in which a face feature value is a HOG (histogram of oriented gradients) feature value (also referred to as a HOG data feature). In this embodiment, an HOG feature value is used based on a principle that a local outline of a detected substance may be described by distribution of light intensity gradients or edge directions. An entire image is divided into small connected regions (referred to as cells), and each cell generates a HOG or an edge direction of a pixel in the cell. A combination of these histograms may represent a descriptor (or the detected target object). To improve accuracy, the local histogram can be contrast-normalized by calculating a measure of the light intensity across a larger region (referred to as a block) of the image, and then all the cells in the block are normalized by using this value (or measure). This normalization completes better invariance to changes in illumination/shadowing.

Compared with another descriptor, the descriptor obtained by the HOG remains invariant to geometric and photometric transformation (except for object direction). Therefore, the HOG descriptor may be used for face detection.

In this embodiment, a method for extracting a HOG feature is that an image goes through the following processes:

1. Grey (viewing an image as a three-dimensional image of x, y, and z (grey-scale));
2. Divide into small cells (2*2);
3. Calculate a gradient (that is, an orientation) of each pixel of each cell; and
4. Count a histogram of gradients of each cell (or the number of different gradients), so that a descriptor of each cell is formed.

In another exemplary embodiment, the terminal may obtain an acceleration of the terminal by using an acceleration sensor, and obtain an angular velocity of the terminal by using a gyro sensor.

It should be noted that, this embodiment includes, for example but is not limited to, obtaining a motion parameter of the terminal by using the acceleration sensor and the gyro sensor. For example, the terminal may obtain the acceleration of the terminal by using a gravity sensor. For another example, the terminal may obtain a motion amplitude and the like of the terminal by using a vibration sensor. A manner of obtaining the motion parameter of the terminal is not limited to this embodiment.

The acceleration sensor is a sensor that is capable of measuring an acceleration of the terminal resulted from the gravity, and converting the obtained acceleration into a usable output signal. The acceleration refers to a force applied to the terminal when the terminal is in an acceleration process. The terminal may obtain a tilt angle that is of the terminal and that is relative to a horizontal plane by using the acceleration obtained by using the acceleration sensor.

A rigid body rotating around a fulcrum at a high speed is referred to as a spinning top, and spinning top apparatuses with various functions made by means of a mechanical property of the spinning top are referred to as gyroscopes. The gyro sensor may measure the accelerations of the terminal on an x-axis, a y-axis, and a z-axis.

For example, when it is detected that the photographing apparatus is in a running state, the terminal may trigger a sensor event on Sensor Changed, and program code corresponding thereto is as follows:

```
public void onSensorChanged(SensorEvent event) {
    switch (event.sensor.getType( )) {
        case Sensor.TYPE_GYROSCOPE: {
    handleGyroscopeEvent(event); break; }
        case Sensor.TYPE_ACCELEROMETER: {
    handleAccelerometerEvent(event); break; }
        default:break;
        }
    }
```

When a type of an event is an acceleration sensor event, code is as follows:

```
private void handleAccelerometerEvent(SensorEvent event) {
    for (int i = 0; i < 3; i++) {
        mGravity[i] = (float) (0.1 * event.values[i] + 0.9 * mGravity[i]);
        mMotion[i] = event.values[i] − mGravity[i];
    }
    boolean motion = false;
    for (int i = 0; i < 3; ++i) {
        if (mMotion[i] > threshold_accelerometer1 || mMotion[i] < threshold_accelerometer2) {
            motion = true;
            break;
        }
    }
    if (motion) {
        mIsAccelerMotion = true;
    } else {
        mIsAccelerMotion = false;
    }
    mIsMotion = mIsAccelerMotion || mIsGyrosMotion; // whether an algorithm output terminal is moving
}
```

When a type of the event is gyro sensor event, code is as follows:

```
private void handleGyroscopeEvent(SensorEvent event) {
    boolean motion = false;
    for (int i = 0; i < 3; ++i) {
        if (event.values[i] > threshold_gyroscope1|| event.values[i] < threshold_gyroscope2) {
            motion = true;
            break;
        }
```

```
        if (motion) {
            mIsGyrosMotion = true;
        } else {
            mIsGyrosMotion = false;
        }
    mIsMotion = mIsAccelerMotion || mIsGyrosMotion; // whether an
algorithm output mobile phone is shaken
    }
```

The method for controlling the terminal may further the following operation:

S102: Generate an image control instruction when the motion parameter is greater than a preset parameter threshold.

The terminal may determine whether the obtained motion parameter is greater than the preset parameter threshold. When the motion parameter is greater than the preset parameter threshold, the terminal may generate the image control instruction. The motion parameter may include one or more of an acceleration, an angular velocity, a motion amplitude, a motion frequency, a motion time, and the like of the terminal. The preset parameter threshold may include one or more of a preset acceleration threshold, a preset angular velocity threshold, a preset amplitude threshold, a preset frequency threshold, a preset time threshold, or the like.

Herein, the preset parameter threshold is a reference standard for determining a motion degree of the terminal.

In another exemplary embodiment, when the motion parameter includes any one of the acceleration, the angular velocity, the motion amplitude, the motion frequency, and the motion time of the terminal, the terminal may determine whether the motion parameter is greater than the preset parameter threshold corresponding to the motion parameter. When the motion parameter is greater than the preset parameter threshold, the terminal may generate the image control instruction. For example, when the photographing apparatus acquires the image, the terminal may obtain the angular velocity of the terminal. When the obtained angular velocity is greater than a preset angular velocity threshold, the terminal may generate the image control instruction.

In another exemplary embodiment, when the motion parameters include at least two from among the acceleration, the angular velocity, the motion amplitude, the motion frequency, and the motion time of the terminal, the terminal may determine whether each motion parameter is greater than the preset parameter threshold corresponding to the motion parameter. When any of the obtained motion parameters is greater than the preset parameter threshold corresponding to the motion parameter, the terminal may generate the image control instruction. For example, the motion parameter includes the acceleration and the angular velocity of the terminal. The terminal may determine whether the obtained acceleration is greater than the preset acceleration threshold. The terminal may further determine whether the obtained angular velocity is greater than the preset angular velocity threshold. When the obtained acceleration is greater than the preset acceleration threshold, or the obtained angular velocity is greater than the preset angular velocity threshold, the terminal may generate the image control instruction.

In another exemplary embodiment, when the motion parameters include at least two from among the acceleration, the angular velocity, the motion amplitude, the motion frequency, and the motion time of the terminal, the terminal may determine whether each motion parameter is greater than the preset parameter threshold corresponding to the motion parameter. When each of the obtained motion parameters is greater than the preset parameter threshold corresponding to the motion parameter, the terminal may generate the image control instruction. For example, after obtaining the acceleration of the terminal by using an acceleration sensor, and obtaining the angular velocity of the terminal by using a gyro sensor, and when the acceleration is greater than the preset acceleration threshold and the angular velocity is greater than the preset angular velocity threshold, the terminal may generate the image control instruction.

For example, the terminal may determine whether the terminal is in a strenuous moving state by using a preset algorithm, and the preset algorithm may be represented by using a motion (e.g., an event or a threshold). The event may be a terminal event (e.g., the obtained motion parameter), and the threshold may be the preset parameter threshold. The event and the threshold are input as the preset algorithm, and an obtained output result is mIsMotion=motion (event, threshold). When the mIsMotion is true, the terminal may determine that the terminal is currently in the strenuous moving state; and when the mIsMotion is false, the terminal may determine that the terminal is currently in a stable state.

In another exemplary embodiment, before generating the image control instruction, the terminal may send a parameter threshold obtaining request to a data management server. The parameter threshold obtaining request may carry configuration information of the terminal, and the terminal may receive the preset parameter threshold that corresponds to the configuration information and that is fed back by the data management server. The configuration information may include a system version or a model of the terminal, a type of a processor, or the like. The disclosure is not limited in this embodiment. During implementation, because terminals corresponding to different configuration information have verifying processing capabilities, the motion parameters obtained by terminals are different. Based on this, the terminal may send the parameter threshold obtaining request to the data management server, and the data management server may search for a preset parameter threshold corresponding to the configuration information of the terminal, so that the data management server may send the found preset parameter threshold to the terminal. Therefore, the terminal may determine a motion degree of the terminal by using the preset parameter threshold, and control the terminal. According to the exemplary embodiment, accuracy of the preset parameter threshold may be improved.

Figures 3, 4:
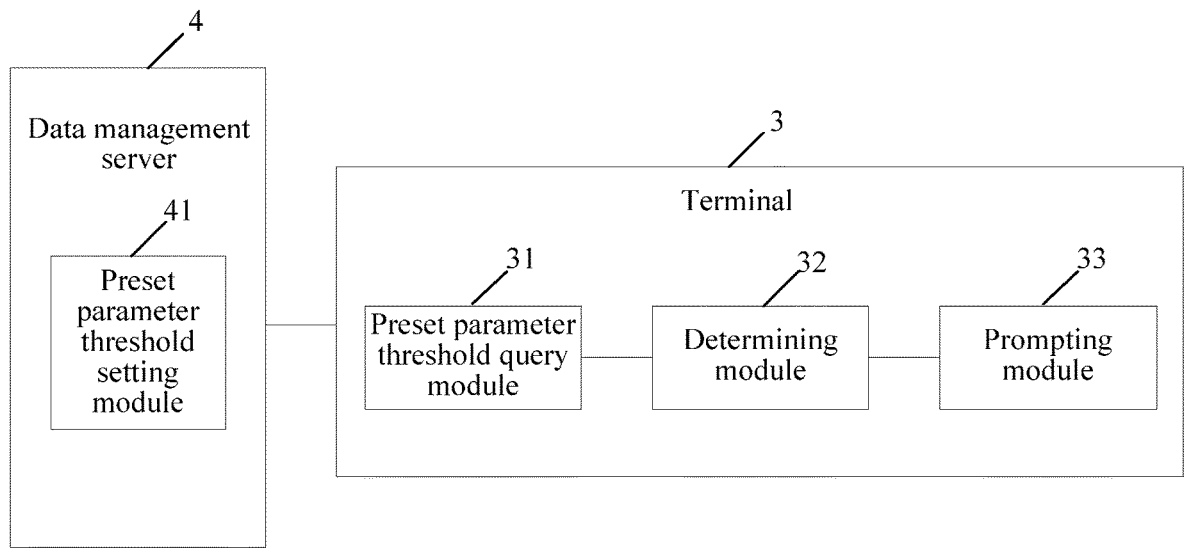
FIG. 3 is a schematic architectural diagram of a terminal control system according to an exemplary embodiment.
FIG. 4 is a data structure diagram of setting a preset parameter threshold according to an exemplary embodiment.

Using a schematic architectural diagram of a terminal control system shown in FIG. 3 as an example, the terminal control system may include a data management server 4 and at least one terminal 3. The data management server 4 may include a preset parameter threshold setting module 41, and the terminal 3 may include a preset parameter threshold query module 31, a determining module 32, and a prompting module 33. The data management server 4 may include at least one processor that implements the preset parameter threshold setting module 41, and the terminal 3 may include at least one processor that implements the preset parameter threshold query module 31, the determining module 32, and the prompting module 33.

The preset parameter threshold setting module 31 is configured to: set preset parameter thresholds for configuration information, and store the configuration information and the preset parameter thresholds corresponding to the configuration information. The configuration information may include a version of the system, a machine model, a type of a processor, or the like.

A data structural diagram of setting a preset parameter threshold may be shown in FIG. 4. The preset parameter threshold query module 31 is configured to: send a parameter threshold obtaining request to the data management server, the parameter threshold obtaining request carrying configuration information of the terminal, and receive the preset parameter threshold that corresponds to the configuration information and that is fed back by the data management server. The determining module 32 is configured to determine whether an obtained motion parameter of the terminal is greater than the preset parameter threshold. The prompting module 33 is configured to prompt the terminal to stop (or skip) moving when the obtained motion parameter is greater than the preset parameter threshold.

In another exemplary embodiment, the terminal may send the parameter threshold obtaining request to the data management server according to a preset time period. The preset time period may be a period of a preset time segment, for example one day or one week. The disclosure is not limited in this embodiment. During implementation, to improve accuracy of the preset parameter threshold, research and development personnel may periodically update the preset parameter threshold, or after the terminal updates the system, the configuration information of the terminal is updated. Different configuration information corresponds to different preset parameter thresholds. Based on this, the terminal may send the parameter threshold obtaining request to the data management server according to the time period, so as to receive the preset parameter threshold that corresponds to the configuration information of the terminal and that is fed back by the data management server. In this embodiment, it may be ensured that the preset parameter threshold obtained by the terminal is an updated preset parameter threshold. In addition, for obtaining a motion parameter at a time, a preset parameter threshold is obtained by using the data management server. This embodiment may improve utilization of system resources.

In another exemplary embodiment, after the terminal obtains the motion parameter of the terminal, and when the motion parameter is greater than the preset parameter threshold, the terminal may generate prompt information, and the prompt information is used for prompting the terminal to stop moving. During implementation, when the motion parameter is greater than the preset parameter threshold, the terminal may determine that the terminal currently moves strenuously. If an acquired image is blur or invisible, the terminal may generate the prompt information, so as to prompt the terminal to stop moving by displaying the prompt information in a preset region of a display screen or playing the prompt information by using a microphone. This embodiment may guide a user in real time to control the terminal to stop moving, so as to obtain a clear image.

Figure 5A:
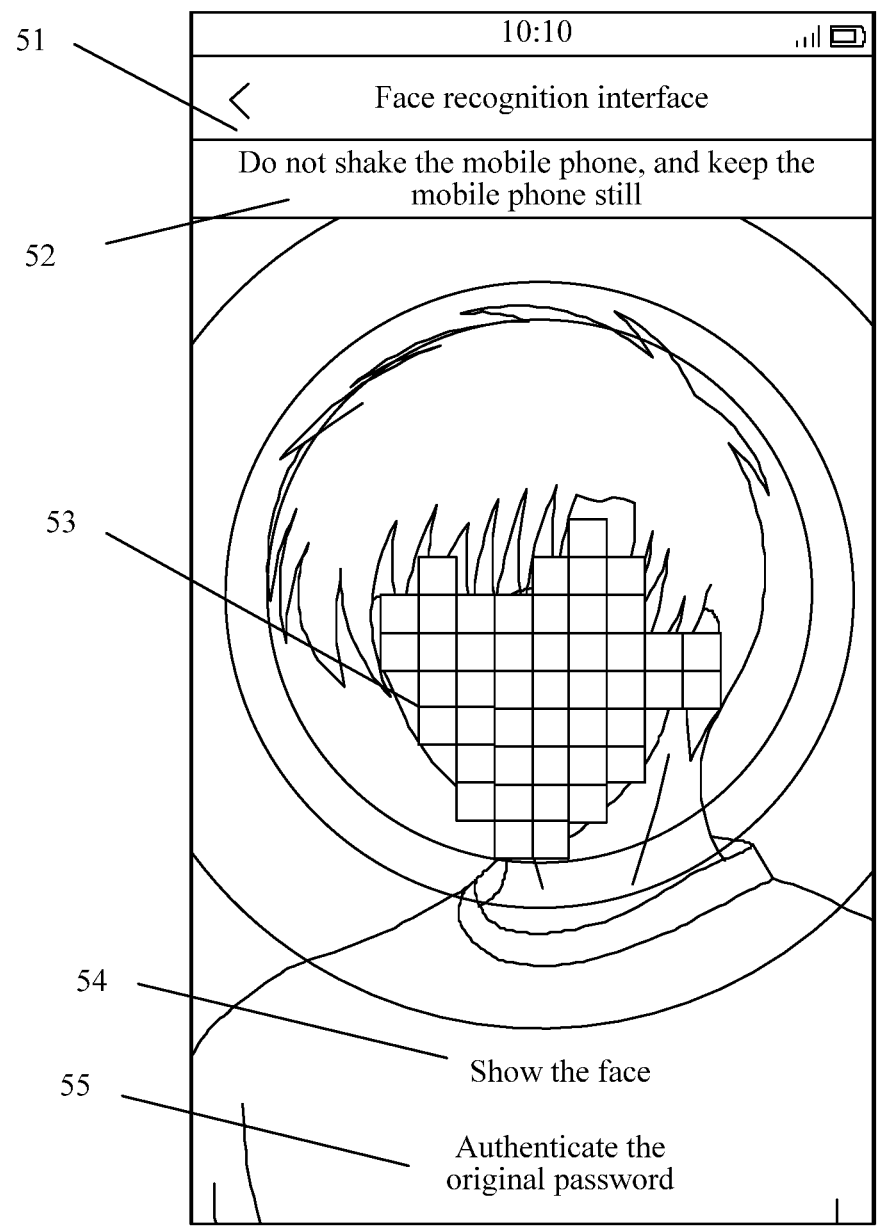
FIG. 5A is a schematic diagram 1 of a face recognition interface according to an exemplary embodiment.

Using a schematic diagram of a face recognition interface 51 as shown in FIG. 5A as an example, the user performs identity authentication in a face recognition manner by clicking on a menu item "original password authentication" 55, so that the terminal authorizes the user to change an account password corresponding to a QQ account. The terminal may display, on a display screen, a face image acquired by using a camera. For example, the terminal prompts the user to acquire a face image 53 by using a menu item "show the face" 54. When the obtained motion parameter is greater than the preset parameter threshold, it indicates that the terminal moves or shifts a lot. In this way, the face image acquired by the terminal by using the photographing apparatus is not clear or blur as shown in FIG. 5A. Herein, boxes 53 are used to represent that the face image is blur.

Figure 5B:
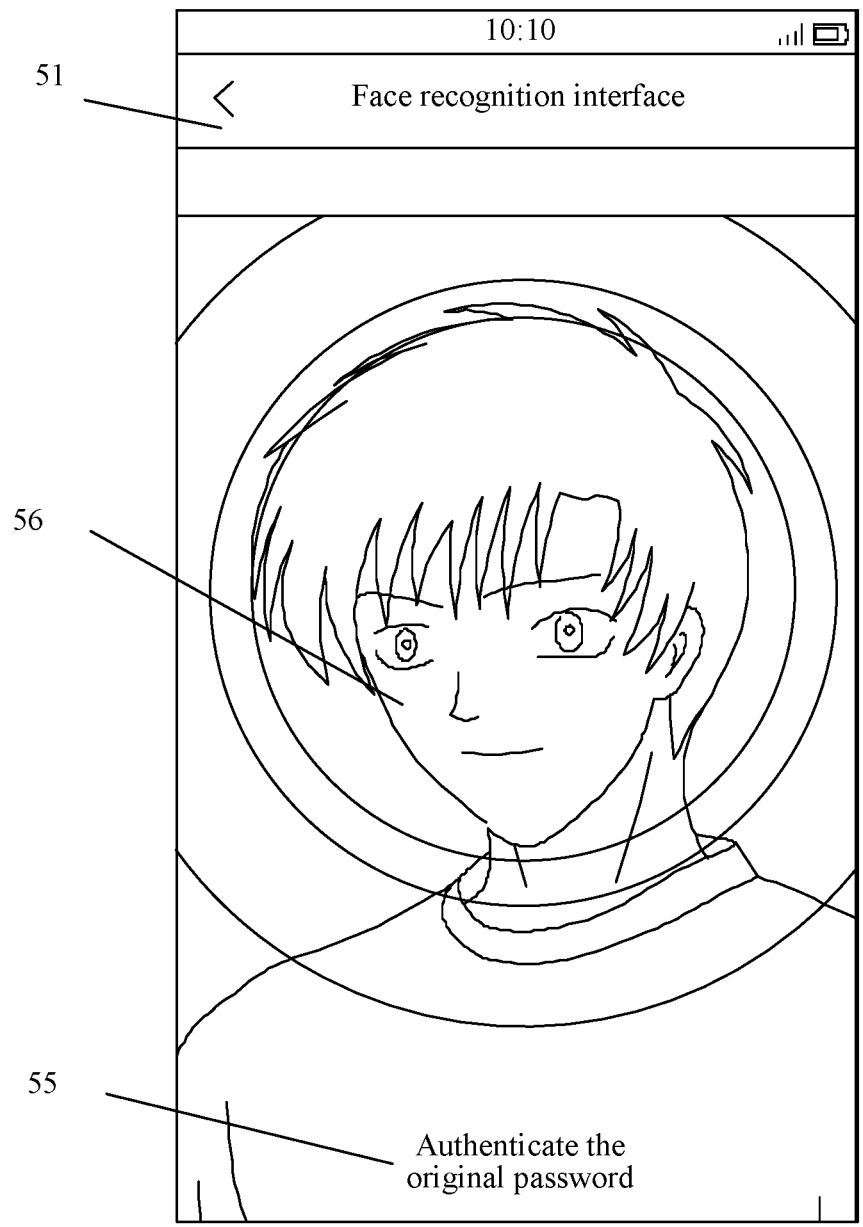
FIG. 5B is a schematic diagram 2 of a face recognition interface according to an exemplary embodiment.
Figure 6:
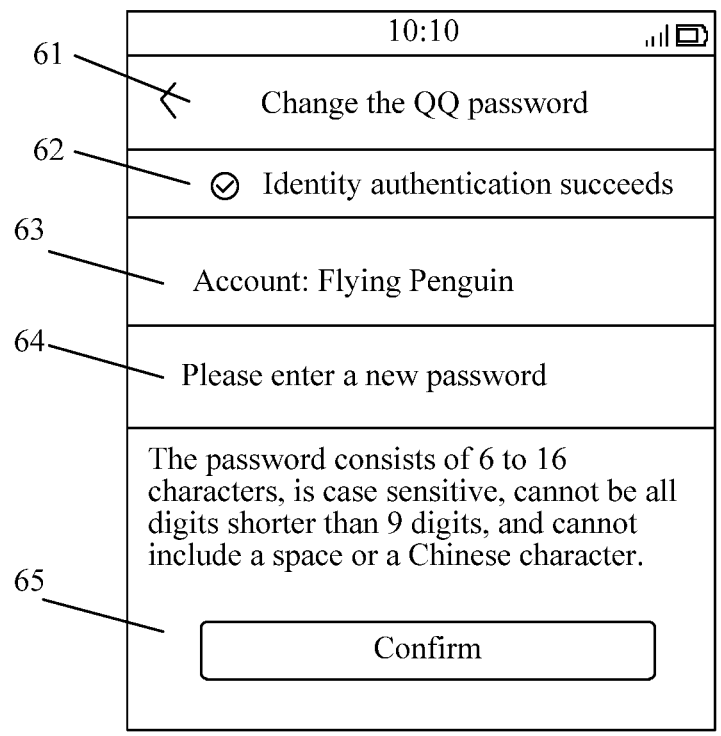
FIG. 6 is a schematic diagram of a password changing interface according to an exemplary embodiment.

In addition, the terminal may further generate prompt information "do not shake the mobile phone, and keep the mobile phone still" 52 to prompt the user to acquire a clear face image. The terminal may alternatively display the prompt information in the preset region, and the user may control, according to the prompt, the terminal to stop moving. In addition, the photographing apparatus may be a camera and acquire a face image in real time. The terminal may obtain a motion parameter in real time. When a motion parameter obtained at a latest time is less than or equal to the preset parameter threshold, as shown in FIG. 5B, a face image 56 acquired by the terminal at the latest time is clear, in this way, the terminal may perform face recognition on the face image acquired at the latest time. To be specific, image data obtained by means of face recognition is compared with image data that corresponds to the QQ account and that is stored in a database. When a similarity between the image data obtained by means of face recognition and the image data that corresponds to the QQ account and that is stored in a database is greater than a preset percentage threshold, it indicates that the face image acquired by the terminal is satisfactory and the terminal may determine that the face recognition is successful. Therefore, the terminal switches to a password changing interface shown in FIG. 6 that is displayed on the display screen and that displays that the identity authentication succeeds 62. A password corresponding to an account 63 may be changed via a menu item "changing the QQ password" 61. The user may enter a new password by selecting a menu item "please enter a password" 64, and clicks on confirm 65 to complete changing the password.

The method for controlling the terminal may further the following operation:

S103: Stop performing image processing on the acquired image according to the image control instruction.

After the terminal generates the image control instruction, the terminal may stop performing image processing on the acquired image according to the image control instruction. That is, image processing is performed on the acquired image based on the motion parameter being equal to or less than the preset parameter threshold. In another exemplary embodiment, after stopping performing image processing on the acquired image according to the image control instruction, the terminal may obtain a motion parameter of the terminal again. When the motion parameter obtained at a latest time is less than or equal to the preset parameter threshold, the terminal may determine that movement of the terminal currently tends to be smooth or the terminal remains still, and the terminal may perform image processing on an image acquired at the latest time.

In another exemplary embodiment, the terminal acquires a face image by using the photographing apparatus, and after generating the image control instruction, the terminal may stop performing face recognition on the acquired face image according to the image control instruction. In another exemplary embodiment, after stopping performing face recognition on the acquired face image according to the image control instruction, the terminal may obtain a motion parameter of the terminal again. When the motion parameter obtained at a latest time is less than or equal to the preset parameter threshold, the terminal may determine that movement of the terminal currently tends to be smooth or the terminal remains still. In this way, the terminal may perform face recognition on a face image acquired at the latest time.

In this embodiment, a face image acquired when the terminal is intensely shaken is deleted. Face recognition is performed on a face image acquired when the terminal is in a stable state. This may ensure that a face image on which face recognition is performed has high quality, and improves a success rate of the face recognition.

In this embodiment, when detecting that the photographing apparatus is in a running state, the terminal acquires an image by using the photographing apparatus and obtains a motion parameter of the terminal. When the motion parameter is greater than the preset parameter threshold, the terminal generates an image control instruction. The terminal may not perform image processing on an image with poor image quality acquired when the photographing apparatus is in the running state and the motion parameter exceeds the preset parameter threshold. This prevents image processing on an image with poor image quality from occupying (or wasting) system resources, thereby improving utilization of the system resources.

Figure 7:
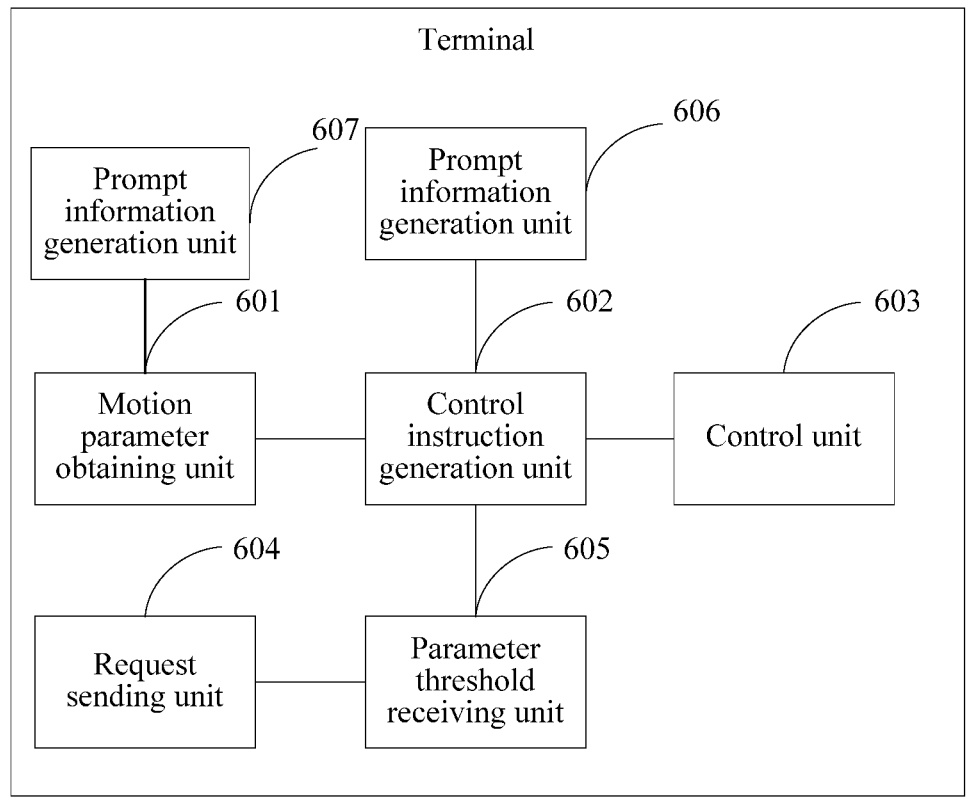
FIG. 7 is a schematic structural diagram of a terminal according to an exemplary embodiment.

FIG. 7 is a schematic structural diagram of a terminal according to an exemplary embodiment.

The terminal may be configured to implement some or all operations in the method embodiments shown in FIG. 1. As shown in the figure, in this embodiment, the terminal may include at least a motion parameter obtaining part 601, a control instruction generation part 602, and a control part 603.

The motion parameter obtaining part 601 is configured to acquire an image by using the photographing apparatus and obtain a motion parameter of the terminal when it is detected that the photographing apparatus is in a running state.

The control instruction generation part 602 is configured to generate an image control instruction when the motion parameter is greater than a preset parameter threshold.

The control part 603 is configured to stop performing image processing on the acquired image according to the image control instruction.

In another exemplary embodiment, the terminal of this embodiment further includes a face instruction receiving part 607.

The face instruction receiving part 607 is configured to receive a face recognition instruction.

The motion parameter obtaining part 601 is configured to: control, according to the face recognition instruction, the photographing apparatus to turn on, to determine that the photographing apparatus is in a running state; and acquire a face image by using the photographing apparatus.

Further, the control part 603 is configured to stop performing face recognition on the acquired face image according to the image control instruction.

In another exemplary embodiment, the motion parameter obtaining part 601 of this embodiment is configured to obtain an acceleration of the terminal by using an acceleration sensor, and obtain an angular velocity of the terminal by using a gyro sensor.

Further, the control instruction generation part 602 is configured to generate the image control instruction when the acceleration is greater than a preset acceleration threshold and the angular velocity is greater than a preset angular velocity threshold.

In another exemplary embodiment, the terminal of this embodiment may further include a request sending part (or request transmitting part) 604 and a parameter threshold receiving part 605.

The request sending part 604 is configured to send a parameter threshold obtaining request to a data management server before the control instruction generation part 602 generates the image control instruction, the parameter threshold obtaining request carrying configuration information of the terminal.

The parameter threshold receiving part 605 is configured to receive the preset parameter threshold that corresponds to the configuration information and that is fed back by the data management server.

In another exemplary embodiment, the request sending part 604 of this embodiment is configured to send the parameter threshold obtaining request to the data management server according to a preset time period.

In another exemplary embodiment, the terminal of this embodiment further includes a prompt information generation part 606.

The prompt information generation part 606 is configured to generate, after the motion parameter obtaining part 601 obtains the motion parameter of the terminal, prompt information when the motion parameter is greater than the preset parameter threshold, the prompt information being used for prompting the terminal to stop moving.

In this embodiment, when detecting that the photographing apparatus is in the running state, the motion parameter obtaining part 601 acquires an image by using the photographing apparatus and obtains a motion parameter of the terminal. When the motion parameter is greater than the preset parameter threshold, the control instruction generation part 602 generates an image control instruction. The control part 603 stops performing image processing on the acquired image according to the image control instruction. Because image processing may not be performed on an image with poor image quality acquired when the photographing apparatus is in the running state and the motion parameter exceeds the preset parameter threshold. This prevents image processing on an image with poor image quality from occupying (or wasting) system resources, thereby improving utilization of the system resources.

Figure 8:
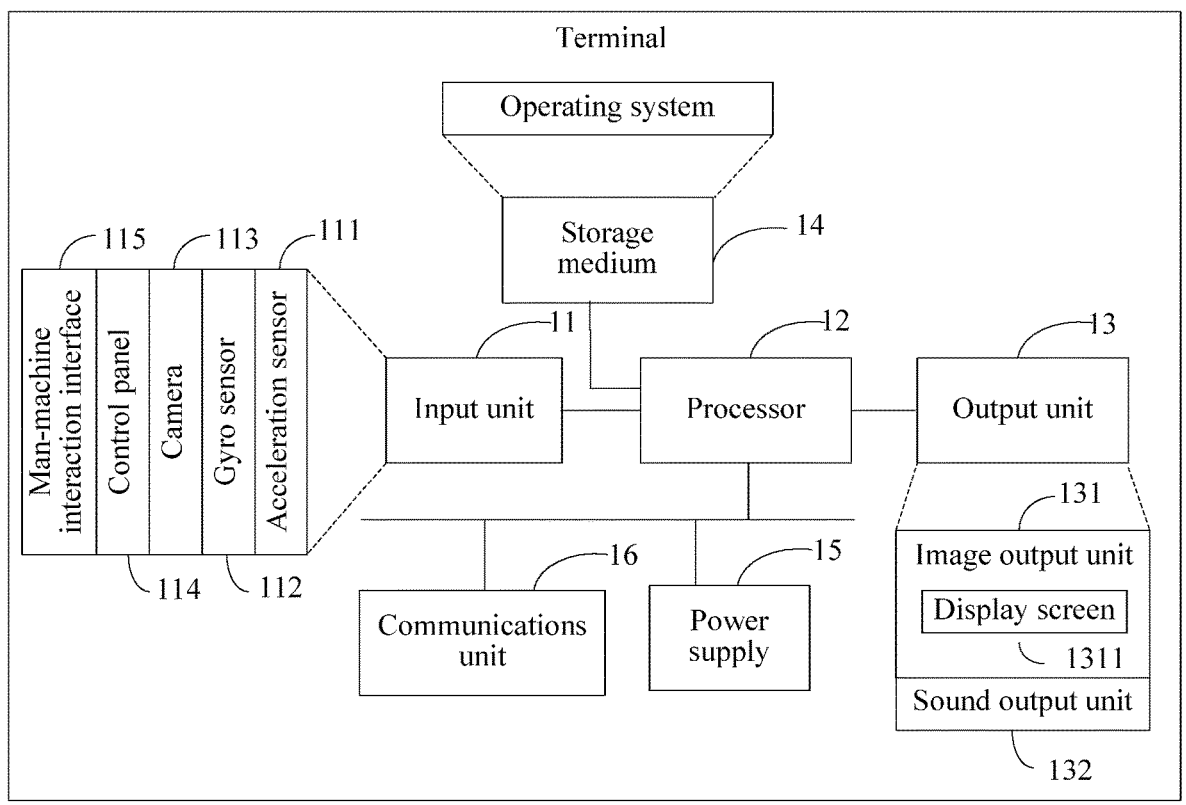
FIG. 8 is a schematic structural diagram of a terminal according to another exemplary embodiment.

FIG. 8 is a schematic structural diagram of a terminal according to another exemplary embodiment. The terminal provided by this embodiment may be configured to implement the method that is shown in FIG. 1 and that is implemented by the foregoing embodiment(s). For ease of description, only a part related to this embodiment is shown. For technology details that are not described herein, refer to the exemplary embodiment shown in FIG. 1.

As shown in FIG. 8, the terminal includes components such as an input unit 11, at least one processor 12, an output unit 13, a storage medium 14, a power supply 15, and a communications unit 16. These components communicate with each other by using one or more buses.

A person skilled in the art may understand that the structure of the terminal shown in the figure does not constitute a limitation to the disclosure. The structure may be a bus structure or a star structure, and the terminal may alternatively include more parts or fewer parts than those shown in the figure, or some parts may be combined, or a different part deployment may be used. In an implementation of the disclosure, the terminal may be any type of a mobile or portable electronic device, which includes, for example but is not limited to, a mobile phone, a mobile computer, a tablet computer, a personal digital assistant (PDA), a media player, an intelligent television, a combination of two or more of the foregoing devices, or the like.

The input unit 11 is configured to implement interaction between a user and the terminal and/or input of information to the terminal. For example, the input unit 11 may receive a number or character information entered by the user, to generate a signal input related to user setting or function control. In this implementation of the disclosure, the input unit 11 includes at least an acceleration sensor 111, a gyro sensor 112, and a camera 113. The input unit 11 may further include a touch control panel 114 and/or another man-machine interaction interface 115, for example, a physical button, a receiver, a vibration sensor, a geomagnetic sensor, or an infrared sensor.

The touch control panel 114, also referred to as a touch-screen or a touch control screen, may acquire an operation action that a user touches or approaches the touch control panel, for example, an operation action of the user on or near the touch control panel 114 by using any appropriate substance or accessory such as a finger or a stylus at a position, and drive a corresponding connection apparatus according to a preset program. In another exemplary embodiment, the touch control panel 114 may include two parts: a touch detection apparatus and a touch controller. The touch detection apparatus detects a touch operation of the user, converts the detected touch operation into an electrical signal, and transfers the electrical signal to the touch controller. The touch controller receives the electrical signal from the touch detection apparatus, converts the electrical signal into touch point coordinates, and sends the touch point coordinates to the processor 12. The touch controller may further receive a command sent by the processor 12 and executes the command. In addition, the touch panel 114 may be implemented through multiple types such as a resistive type, a capacitive type, an infrared type, or a surface acoustic wave type. In another implementation of the disclosure, a substantive input key of the input unit 11 may include, for example but is not limited to, one or more of a physical keyboard, a functional key (such as a volume control key or a switch key), a track ball, a mouse, and a joystick. The input unit 11 in a microphone manner may acquire voice input by the user or the environment and converts the voice into a command that can be executed by the processor 12 in an electrical signal manner.

The processor 12 is a control center of the terminal, connects parts of the entire terminal by using various interfaces and circuits, and executes various functions of the terminal and/or process data by running or executing a software program and/or module stored in the storage medium 14 and invoking data stored in the storage medium 14. The processor 12 may include an integrated circuit (IC), for example, may include a single packaged IC, or may include multiple successive packaged ICs that have same functions or different functions. For example, the processor 12 may include a central processing unit (CPU), or may be a combination of a GPU, a digital signal processor (DSP), and a control chip (for example, a baseband chip) in the communications unit 16. In this embodiment, the CPU may be of a single operation core, and may also include multiple operation cores.

The output unit 13 includes, for example but is not limited to, an image output unit 131 and a sound output unit 132. The image output unit 131 is configured to output prompt information. The prompt information may be text, a picture and/or video, or the like. The sound output unit 132 may be a vibration sensor, a microphone, or the like, and is configure to output prompt information. The prompt information may be vibration, a ringtone, or the like. In this embodiment, the image output unit 131 includes at least a display screen 1311, for example, a display screen that is configured by using a liquid crystal display (LCD), an organic light-emitting diode (OLED), or a field emission display (FED). Alternatively, the image output unit 131 may include a reflective display, for example, an electrophoretic display, or a display using an interferometric modulation of light technology. The image output unit 131 may include a single display or multiple displays of different sizes. In this implementation of the disclosure, the touch control panel 112 used by the input unit 11 and the display screen 1311 used by the output unit 13 may be collectively referred to as a display. When the touch control panel 112 detects a touch operation on the touch control panel 112 or a gesture operation near the touch control panel 112, the touch control panel 112 transfers the touch operation or the gesture operation to the processor 12 to determine a type of a touch event. Subsequently, the processor 12 provides corresponding visual output on the display screen 1311 according to the type of the touch event. Although, in FIG. 8, the input unit 11 and the output unit 13 are used as two separate parts to implement input and output functions of the terminal, in some embodiments, the touch control panel 112 and the display screen 1311 may be integrated to implement the input and output functions of the terminal. For example, the image output unit 131 may display various graphical user interfaces (GUI) to be used as a virtual control component, and the graphical user interfaces include, for example but are not limited to, a window, a scrollbar, an icon, and a clipbook, so that the user performs an operation in a touch control manner.

In this implementation of the disclosure, the image output unit 131 includes a filter and an amplifier, configured to filter and amplify video output by the processor 12. The sound output unit 132 includes a digital-to-analog converter, configured to convert an audio signal output by the processor 12 from a digital format to an analog format.

The storage medium 14 may be configured to store a software program and a module. The processor 12 runs the software program and module stored in the storage medium 14, so as to execute various function applications and implement data processing of the terminal. The storage medium 14 may mainly include a program storage area and a data storage area. The program storage area may store an operating system, an application program required by at least one function, such as a sound playing function and an image display function. The data storage area may store data (e.g., such as audio data and an address book) created according to use of the terminal, and the like. In this implementation of the disclosure, the storage medium 14 may include a volatile memory, for example, a nonvolatile random access memory (NVRAM), a phase change RAM (PRAM), or a magnetoresistive RAM (MRAM), and may alternatively include a non-volatile memory, for example, at least one magnetic disk storage device, an electrically erasable programmable read-only memory (EEPROM), or a flash memory, such as a NOR flash memory or a NAND flash memory. The non-volatile memory stores an operating system and an application program executed by the processor. The storage medium 14 loads a running program and data from the non-volatile memory to a memory and stores digital content in a large quantity of storage apparatuses. The operating system includes various components and/or drivers configured to control and manage a regular system task, for example, memory management, storage device control, or power supply management, and help communication between various software and hardware. In this implementation of the disclosure, the operating system may be an Android system of Google, an iOS system developed by Apple Inc., or a Windows operating system developed by Microsoft Corporation, or the like, or an embedded operating system such as Vxworks.

The application program includes any application installed on an electronic device, and includes, for example but is not limited to, a browser, an email, an instant messaging service, word processing, keyboard virtualization, a window widget, encryption, digital right management, voice recognition, voice replication, positioning (for example, a function provided by a global positioning system), music playing, or the like.

The power supply 15 is configured to supply power to different parts of the terminal to maintain running of the terminal. Generally, the power supply 15 may be a built-in battery, for example, a common lithium-ion battery, or a NiMH battery, and may also include an external power supply that directly supplies power to the electronic device, for example, an AC adapter. In some implementations of the disclosure, a more extensive definition may further be given to the power supply. For example, the power supply may alternatively include a power supply management system, a charging system, a power supply fault detection circuit, a power supply converter or inverter, a power supply condition indicator (for example, a light-emitting diode), any another component associated with generation, management, and distribution of electric energy of the electronic device.

The communications unit 16 is configure to establish a communications channel, enabling the terminal to be connected to a remote server by using the communications channel and download media data from the remote server. The communications unit 16 may include a communications module such as a wireless local area network (WLAN) module, a Bluetooth module, or a baseband module, and a radio frequency (RF) circuit corresponding to the communications module, and is configured to perform WLAN communication, Bluetooth communication, or infrared communication and/or cellular communications system communication, for example, wideband code division multiple access (WCDMA) and/or high speed downlink packet access (HSDPA). The communications module is configured to control communication between components in the electronic device, and may support direct memory access.

In different implementations of the disclosure, the communications modules in the communications unit 16 are generally in a form of an integrated circuit chip which may be selectively combined and does not need to include all communications modules or a corresponding antenna group. For example, the communications unit 16 may include a baseband chip, an RF chip, and corresponding antennas to provide a communication function in a cellular communications system. For wireless communication connection established by using the communications unit 16, for example, WLAN access or WCDMA access, the terminal may be connected to a cellular network or the Internet. In some other implementations of the disclosure, the communications module, for example, the baseband module in the communications unit 16 may be integrated to the processor 12, typically, for example, a series of platforms such as APQ+MDM provided by Qualcomm.

The RF circuit is configured to receive and send information and receive and send a signal during a call. For example, after receiving downlink information of a base station, the RF circuit sends the downlink information to the processor 12 for processing. In addition, the RF circuit sends designed uplink data to the base station. Generally, the RF circuit includes a known circuit for performing these functions, which includes, for example but is not limited to, an antenna system, an RF transceiver, one or more amplifiers, a tuner, one or more oscillators, a digital signal processor, a CODEC chip set, a subscriber identity module card, memory, and the like. In addition, the RF circuit may also communicate with a network and another device by wireless communication. The wireless communication may use any communications standard or protocol, which includes, for example but is not limited to, Global System for Mobile communication (GSM), General Packet Radio Service (GPRS), Code Division Multiple Access (CDMA), Wideband Code Division Multiple Access (WCDMA), High Speed Uplink Packet Access (HSUPA), Long Term Evolution (LTE), email, Short Messaging Service (SMS), and the like.

In a terminal provided by an exemplary embodiment, a storage medium 14 stores an executable instruction, and a processor 12, an input unit 11, and an output unit 13 invokes the executable instruction stored in the internal storage medium 14. The executable instruction is used for performing the following operations:

acquiring, by a camera 113, an image when the camera 113 is in a running state;

obtaining, by a processor 12, a motion parameter of the terminal, the motion parameter being stored in the storage medium 14;

generating, by the processor 12, an image control instruction when the motion parameter is greater than a preset parameter threshold; and stopping, by the processor 12, performing image processing on the acquired image according to the image control instruction.

In another exemplary embodiment, the acquiring, by a camera 113, an image when the camera 113 is in a running state may include:

receiving, by the input unit 11, a face recognition instruction, and controlling, by the processor 12 according to the face recognition instruction, the camera 113 to turn on, when the camera 113 is turned on, the camera 113 being turned on indicating that the camera 113 is in the running state; and acquiring, by the photographing apparatus 113, a face image.

Further, the stopping, by the processor 12, performing image processing on the acquired image according to the image control instruction may include:

stopping, by the processor 12, performing face recognition on the acquired face image according to the image control instruction.

In another exemplary embodiment, the obtaining, by a processor 12, a motion parameter of the terminal may include:

obtaining an acceleration of the terminal by using an acceleration sensor 111, and obtaining an angular velocity of the terminal by using a gyro sensor 112.

Further, the generating, by the processor 12, an image control instruction when the motion parameter is greater than a preset parameter threshold may include:

generating, by the processor 12, the image control instruction when the acceleration is greater than a preset acceleration threshold, and the angular velocity is greater than a preset angular velocity threshold.

In another exemplary embodiment, before the generating, by the processor 12, an image control instruction when the motion parameter is greater than a preset parameter threshold, the following operations may be performed:

sending, by the output unit 13, a parameter threshold obtaining request to a data management server, the parameter threshold obtaining request carrying configuration information of the terminal; and receiving, by the input unit 11, the preset parameter threshold that corresponds to the configuration information and that is fed back by the data management server.

In another exemplary embodiment, the sending, by the output unit 13, a parameter threshold obtaining request to a data management server may include:

sending, by the output unit 13, the parameter threshold obtaining request to the data management server according to a preset time period.

In another exemplary embodiment, after the obtaining, by a processor 12, a motion parameter of the terminal, the following operation may be performed:

generating, by the processor 12, prompt information when the motion parameter is greater than the preset parameter threshold, the prompt information being used for prompting the terminal to stop moving.

The terminal described in this embodiment may be configured to implement some or all processes in the method embodiments described with reference to FIG. 1.

An exemplary embodiment provides a computer-readable storage medium, storing a machine instruction, the machine instruction, when executed by one or more processors, causing the processors to perform the following operations:

acquiring an image by using the photographing apparatus and obtaining a motion parameter of the terminal when it is detected that the photographing apparatus is in a running state; generating an image control instruction when the motion parameter is greater than a preset parameter threshold; and stopping performing image processing on the acquired image according to the image control instruction.

A person of ordinary skill in the art may understand that all or some of the processes of the methods in the foregoing embodiments may be implemented by a computer program instructing relevant hardware. The program may be stored in a computer-readable storage medium. When the program is executed, the processes of the methods in the foregoing embodiments are performed. The storage medium may be a magnetic disk, an optical disc, a read-only memory (ROM), a random access memory (RAM), or the like.

According to various exemplary embodiments, because the terminal filters the acquired images, and stops performing image processing on an acquired image that does not satisfy a preset parameter threshold, the terminal is prevented from occupying system resources due to such image processing. The terminal reacquires an image of better quality and performs image processing again. In this way, utilization of the system resources is improved At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component such as a processor or a circuit, and/or a software component that is executed by a hardware component such as a processor.

As above, a few embodiments have been shown and described. Exemplary embodiments and advantages are merely exemplary and are not to be construed as limiting the inventive concept. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method for controlling a terminal, the terminal comprising a capturing apparatus and at least one processor, the method comprising:

acquiring, by the capturing apparatus, an image;

obtaining, by the at least one processor, a motion parameter of the terminal, the motion parameter comprising at least one of a motion frequency or a motion time, and two or more parameters from among an acceleration, an angular velocity, a motion amplitude, the motion frequency, and the motion time;

transmitting, by the at least one processor, a parameter threshold obtaining request to a data management server, the parameter threshold obtaining request comprising configuration information of the terminal;

receiving corresponding preset thresholds that correspond to the configuration information in response to the parameter threshold obtaining request;

comparing the two or more parameters with the corresponding preset thresholds; and controlling, by the at least one processor, not to perform image processing on the acquired image based on at least one of the two or more parameters of the motion parameter being greater than a corresponding preset threshold or based on the two or more parameters of the motion parameter being respectively greater than the corresponding preset thresholds, wherein the acquiring comprises acquiring the image in real time, and the obtaining comprises obtaining the motion parameter of the terminal in real time, the method further comprising:

in response to the at least one of the two or more parameters of the motion parameter being greater than the corresponding preset threshold, obtaining the motion parameter of the terminal again; and in response to the two or more parameters of the motion parameter obtained at a latest time being less than or equal to the corresponding preset thresholds, performing the image processing on the image acquired at the latest time.

2. The method according to claim 1, wherein the acquiring comprises:
controlling, by the at least one processor, to turn on the capturing apparatus based on a face recognition instruction; and
acquiring, by the capturing apparatus, a face image when the capturing apparatus is turned on.

3. The method according to claim 2, wherein the controlling not to perform the image processing comprises:
skipping performing face recognition on the acquired face image based on the at least one of the two or more parameters of the motion parameter being greater than the corresponding preset threshold or based on the two or more parameters of the motion parameter being respectively greater than the corresponding preset thresholds.

4. The method according to claim 1, wherein the obtaining comprises at least one of:
obtaining the acceleration of the terminal by using an acceleration sensor; or
obtaining the angular velocity of the terminal by using a gyro sensor.

5. The method according to claim 1, wherein the transmitting comprises:
transmitting the parameter threshold obtaining request to the data management server according to a preset time period.

6. The method according to claim 1, further comprising:
generating prompt information based on the at least one of the two or more parameters of the motion parameter being greater than the corresponding preset threshold, the prompt information being used for prompting the terminal to stop moving.

7. The method according to claim 1, wherein the motion parameter comprises the motion frequency and the motion time.

8. A terminal comprising:
a capturing apparatus;
at least one memory configured to store program code; and
at least one processor configured to access the at least one memory and operate according to the program code, the program code comprising:
motion parameter obtaining code configured to cause the at least one processor to acquire an image by using the capturing apparatus and obtain a motion parameter of the terminal, the motion parameter comprising at least one of a motion frequency or a motion time, and two or more parameters from among an acceleration, an angular velocity, a motion amplitude, the motion frequency, and the motion time;
request transmitting code configured to cause the at least one processor to transmit a parameter threshold obtaining request to a data management server, the parameter threshold obtaining request comprising configuration information of the terminal;
parameter threshold receiving code configured to cause the at least one processor to receive corresponding preset thresholds that correspond to the configuration information in response to the parameter threshold obtaining request;
comparing code configured to cause the at least one processor to compare the two or more parameters with the corresponding preset thresholds; and
control code configured to cause the at least one processor not to perform image processing on the acquired image based on at least one of the two or more parameters of the motion parameter being greater than a corresponding preset threshold or based on the two or more parameters of the motion parameter being respectively greater than the corresponding preset thresholds,
wherein the motion parameter obtaining code causes the at least one processor to:
acquire the image in real time and obtain the motion parameter of the terminal in real time, and
in response to the at least one of the two or more parameters of the motion parameter being greater than the corresponding preset threshold, obtain the motion parameter of the terminal again, and
wherein the control code causes the at least one processor to, in response to the two or more parameters of the motion parameter obtained at a latest time being less than or equal to the corresponding preset thresholds, perform the image processing on the image acquired at the latest time.

9. The terminal according to claim 8, wherein the program code further comprises face instruction receiving code configured to cause the at least one processor to receive a face recognition instruction,
wherein the motion parameter obtaining code causes the at least one processor to control, according to the face recognition instruction, the capturing apparatus to turn on, and acquire a face image by using the capturing apparatus when the capturing apparatus is turned on; and
wherein the control code causes the at least one processor to skip performing face recognition on the acquired face image based on the at least one of the two or more parameters of the motion parameter being greater than the corresponding preset threshold or based on the two or more parameters of the motion parameter being respectively greater than the corresponding preset thresholds.

10. The terminal according to claim 8, wherein the request transmitting code causes the at least one processor to transmit the parameter threshold obtaining request to the data management server according to a preset time period.

11. The terminal according to claim 8, wherein the program code further comprises:
prompt information generation code configured to cause the at least one processor to generate prompt information based on at least one of the two or more parameters of the motion parameter being greater than the corresponding preset threshold, the prompt information being used for prompting the terminal to stop moving.

12. The terminal according to claim 8, wherein the motion parameter comprises the motion frequency and the motion time.

13. A non-transitory computer-readable storage medium, storing a machine instruction, which, when executed by one or more processors, causes the one or more processors to perform:
obtaining an image acquired by a capturing apparatus;
obtaining a motion parameter of a terminal, the terminal comprising the capturing apparatus, the motion parameter comprising at least one of a motion frequency or a motion time, and two or more parameters from among an acceleration, an angular velocity, a motion amplitude, the motion frequency, and the motion time;

transmitting a parameter threshold obtaining request to a data management server, the parameter threshold obtaining request comprising configuration information of the terminal;

receiving corresponding preset thresholds that correspond to the configuration information in response to the parameter threshold obtaining request;

comparing the two or more parameters with the corresponding preset thresholds; and controlling not to perform image processing on an acquired image based on at least one of the two or more parameters of the motion parameter being greater than a corresponding preset threshold or based on the two or more parameters of the motion parameter being respectively greater than the corresponding preset thresholds, wherein the acquiring comprises acquiring the image in real time, and the obtaining comprises obtaining the motion parameter of the terminal in real time, the method further comprising:

in response to the at least one of the two or more parameters of the motion parameter being greater than the corresponding preset threshold, obtaining the motion parameter of the terminal again; and in response to the two or more parameters of the motion parameter obtained at a latest time being less than or equal to the corresponding preset thresholds, performing the image processing on the image acquired at the latest time.

14. The non-transitory computer-readable storage medium according to claim 13, wherein the acquired image is a face image and the image processing comprises performing face recognition.

15. The non-transitory computer-readable storage medium according to claim 13, wherein the obtaining the motion parameter comprises at least one of:

obtaining the acceleration of the terminal by using an acceleration sensor; or obtaining the angular velocity of the terminal by using a gyro sensor.

16. The non-transitory computer-readable storage medium according to claim 13, wherein the motion parameter comprises the motion frequency and the motion time.

* * * * *